(No Model.)

W. A. JACKSON & J. C. CHAMBERS.
APPARATUS FOR SUPPRESSING INDUCTION DISTURBANCES.

No. 322,724. Patented July 21, 1885.

Witnesses:
Charles B. Lothrop.
Sumner Collins.

Figure 1:
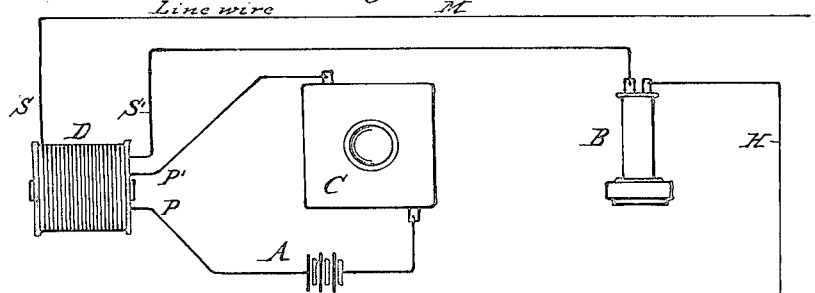
Figure 2:
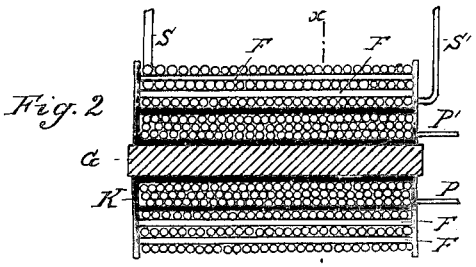
Figure 3:
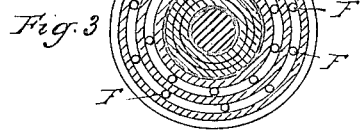
Figure 5:
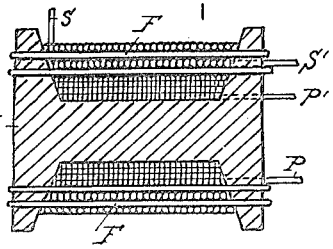
Figure 4:
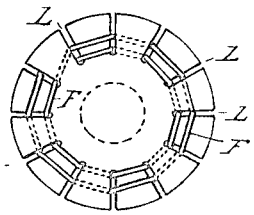

Inventor:
William A. Jackson
Josephus C. Chambers
by Geo. H. Lothrop atty.

coil D, and wind a single coil or spool exactly as hereinbefore described for winding the secondary coil of the induction-coil D, and as shown in Fig. 5, and we then insert this spool in the circuit by connecting its ends S S' in said circuit as the ends S S' are connected, Fig. 1. This modification of our invention may, however, be put in the talking-circuit at a point between the receiver and the ground, as well as in the place shown in Fig. 1.

We prefer to have one of our improved induction-coils attached to each telephone, or one of the spools similarly attached, though we find that one such coil will protect the receivers at both ends of a circuit. We also prefer to use the full induction-coil and discard the ordinary induction-coil, as we find that such arrangement transmits speech more clearly and powerfully than when the ordinary coil is retained and our invention attached thereto.

We have demonstrated by practical and oft-repeated trials that our invention efficiently accomplishes the elimination of inductive disturbances; but the theory of its operation is in the present state of the art hardly susceptible of absolute definition.

What we claim as our invention, and desire to secure by Letters Patent, is—

1. The combination, with an electrical circuit, of one or more pieces of metal, F, arranged within but insulated from the convolutions of a coil forming part of said circuit and at an angle therewith, substantially as and for the purposes set forth.

2. An induction-coil having between the layers of its secondary coil one or more pieces of metal insulated from and not parallel with the wire composing said secondary coil.

3. The induction-coil D, consisting of a core, a primary coil, and a secondary coil having between the layers thereof the wires F, substantially as and for the purposes set forth.

4. The combination, with the line-wire, transmitter, and receiver of a telephone system, of an induction-coil and electrical conductors placed between the layers of the secondary coil of said induction-coil at an angle with the wire composing said secondary coil and insulated therefrom, substantially as shown and described.

5. The combination, with a telephonic circuit and with the transmitting and receiving telephones thereof, of a neutralizing-coil comprising a helix of wire included in or adapted to be included in said telephonic circuit, and a metallic wire or series of wires interposed between the layers and crossing the convolutions of said helix, but insulated therefrom, substantially as and for the purposes described.

6. The combination, with a telephone-circuit, of an induction neutralizing-coil comprising a helix of insulated wire included in said circuit, and an electric conductor or series of said conductors interposed between the layers of wire composing said helix transversely to the convolutions thereof and insulated therefrom, substantially as described.

7. The combination, with a telephonic circuit, of the helix composed of the wire S S', wound on the core K, and having interposed between its layers one or more metallic wires F, substantially as shown and described.

WILLIAM A. JACKSON.
JOSEPHUS C. CHAMBERS.

Witnesses:
CHARLES B. LOTHROP,
GEO. H. LOTHROP.